United States Patent [19]

Fang

[11] Patent Number: 4,876,723
[45] Date of Patent: Oct. 24, 1989

[54] LOUDSPEAKER SYSTEM
[75] Inventor: Jimmy Fang, Taipei, Taiwan
[73] Assignee: Peter Tsung-Hou Fei, Calif.
[21] Appl. No.: 278,026
[22] Filed: Nov. 30, 1988
[51] Int. Cl.[4] .............................................. H05K 5/00
[52] U.S. Cl. .................................... 381/182; 381/188;
     381/205; 381/90; 181/144; 181/155
[58] Field of Search ............... 381/182, 184, 186, 188,
     381/205, 89, 90; 181/144, 145, 155, 183, 188

[56] References Cited
U.S. PATENT DOCUMENTS
4,811,406  3/1989  Kawachi ............................... 381/90
FOREIGN PATENT DOCUMENTS
2325603  12/1974  Fed. Rep. of Germany ...... 181/155

Primary Examiner—Forester W. Isen
Attorney, Agent, or Firm—Cushman, Darby & Cushman

[57] ABSTRACT

A coaxial-type multi-speaker system is provided for use in automobiles which includes a low frequency transducer, a high frequency transducer, and a cover of elongated substantially half-cylindrical periphery open at the two oppositely disposed lengthwise terminating ends. Inside the cover there are two sound reflector panels of substantially V-shaped cross section positioned perpendicularly to the length of the cover in double level fashion. Sound output thereof is of symmetrical fashion, suitable for application in confined environments where listeners are prone to occupy one of several designated locations.

3 Claims, 5 Drawing Sheets

4,876,723

LOUDSPEAKER SYSTEM

BACKGROUND OF THE INVENTION

The present invention relates to a loudspeaker system for use in an automobile, and in more particular to a coaxial-type multi-speaker system for use in an automobile.

Improvement of the high-fidelity sound of loudspeaker systems has always been the object of much research. Coaxial-type multi-speaker systems have thus gained much wider acceptance of use in the automobile, and in spite of the advanced characteristics of such loudspeaker systems, results have been less than satisfactory when installed inside an automobile. In the past, various modifications have been proposed aimed at enhancing the realism of stereophonic reproduction in the environment of the automobile. These have included positioning of the tweeter and midrange transducer distinct of the low frequency transducer (U.S. Pat. No. 4,502,149), or the positioning of the tweeter and midrange transducer above the lower frequency transducer with central axes fixed at approximately 30 degree angle difference (U.S. Pat. No. 4,451,928). The present application is also concerned with the creation of improved stereophonic reproduction within the environment of the automobile, and in particular focuses on two problems common to the stereophonic reproduction of sound in the special environment of the automobile, and common to the above reference patents.

More specifically, one type distortion common to multi-speaker systems is crossfield phase distortion. Such distortion occurs at the frequency point where two transducers of differing sizes functioning together as a discrete channel meet, and is due to the time or phase difference between sound waves of the two transducers. Interference results, and the net effect is phase peaks, drops or cancellation, usually affecting midrange definition most severely. Attempts to rectify such include the placing of the higher frequency transducer at a point where the inner edge of the cone-shaped diaphram of both the higher and lower frequency transducers lie in the same plane, or the fixing of a time delay plate over the membrane of the higher frequency transducer.

The crossfield phase distortion of coaxial-type multi-speaker systems, such as are commonly used in automobiles, is obviously especially pronounced as sound waves of the higher frequency transducer will always be spatially in front of those of the lower frequency transducer. The small environment of the automobile is not suitable for application of the said time delay plate, and thus distortion results in the special environment of the automobile.

In addition, perception of stereophonic sound is basically contingent upon two conditions being met. The listener must be positioned so as to receive signals from the two discrete channels, and the signals thus received must be of the correct proportion as dictated by the originally recorded sound. In the special environment of the automobile, these two conditions can only be met at a point located center of the back seat. Passengers seated, as is usually the case, off-center of such point receive signals strongly from the channel fixed on their respective side and signals weakly from the channel fixed on the opposing side.

To solve the foregoing problems, the present application therefore proposes a coaxial-type multi-speaker system for use in a motor vehicle which includes a low frequency transducer, a high frequency transducer, and a specially designed cover of elongated substantially half-cylindrical periphery open at the two oppositely disposed lengthwise terminating ends, and inside the cover there are two sound reflector panels of V-shaped cross section mounted in double level fashion, one above the center of each transducer's membrane. The coaxial-type multi-speaker system thus constructed will separately divide the sound outputs of the high and low frequency transducers into two separate equal halves which will then be emitted from the two open ends of the cover in symmetrical fashion, and if the sound reflector panels are also fixed at distances relative to their respective transducers such as is capable of amending for the relatively faster moving sound waves of the higher frequency transducer, a total output relatively free of crossfield phase distortion may be obtained. Such a speaker system, if mounted on or under the rear parcel tray of a motor vehicle as the present application suggests, will utilize the rear window and side walls of said motor vehicle as sound reflecting barriers, and the passengers seated in the rear seats of such automobile will receive sound signals from the two discrete stereo channels relatively free of crossfield phase distortion and which most closely approximate the intended sound signal proportions as dictated by the originally recorded sound.

Also, prior art has frequently seen use of a cone-shaped reflector, usually utilized with a single low frequency transducer, mounted such that the apex point of the reflector is facing the center of the transducer's membrane. The purpose of this type reflector is production of an output of all directions, and this type transducer is commonly termed an omni-directional speaker. The present application is concerned with production of an output focused in two opposite directions and is not to be confused with such type speaker.

SUMMARY OF THE INVENTION

It is an object of the present invention to provide a coaxial-type multi-speaker system for use in a motor vehicle which has a specially designed cover attached to the speakers thereof.

It is a further object of the present invention to provide a coaxial-type multi-speaker system for use in a motor vehicle which is capable of providing improved sound quality and stereophonic reproduction to the passengers thereof.

Other objects and advantages of the present invention will be apparent to those skilled in the art from the drawings and following detailed description.

BRIEF DESCRIPTION OF THE DRAWINGS

The present invention will now be described in detail with reference to the drawings in which.

DETAILED DESCRIPTION OF THE PREFERRED EMBODIMENT

Figure 1:
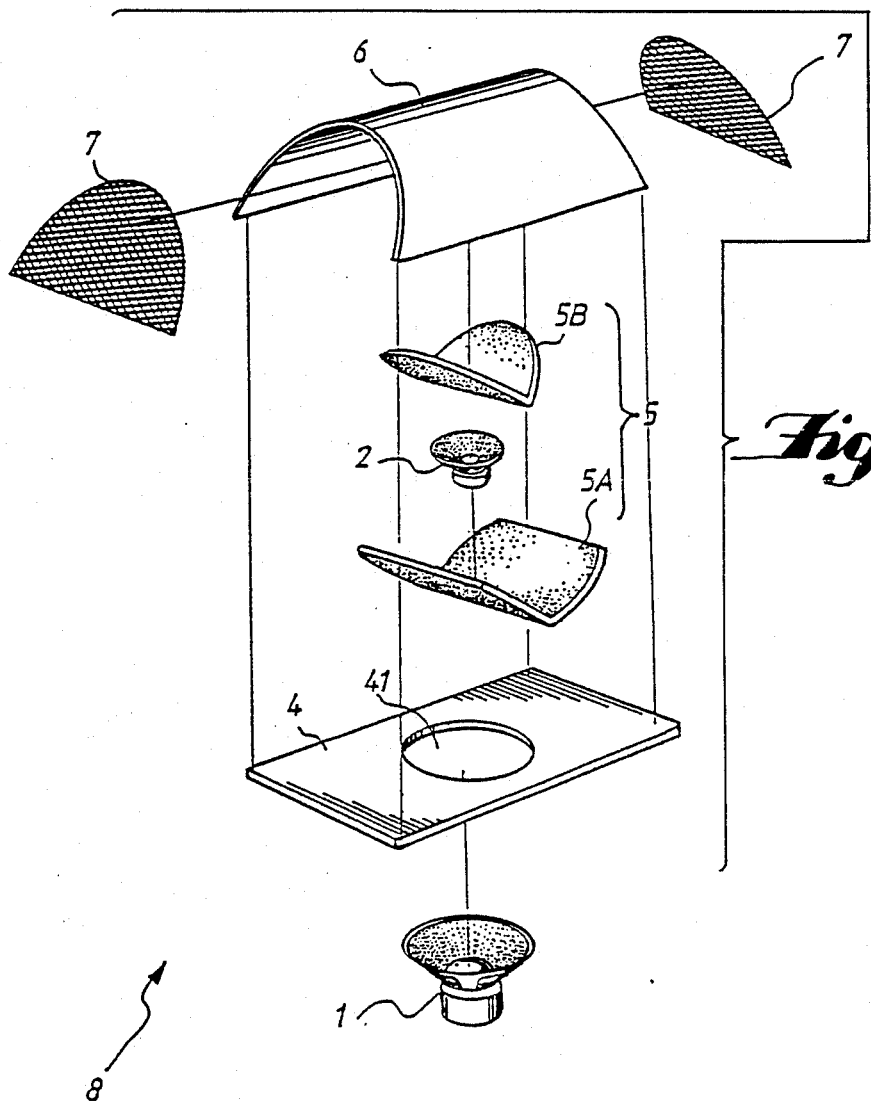
FIG. 1 is an exploded perspective view of one example of the loudspeaker system of the present invention.
Figure 2:
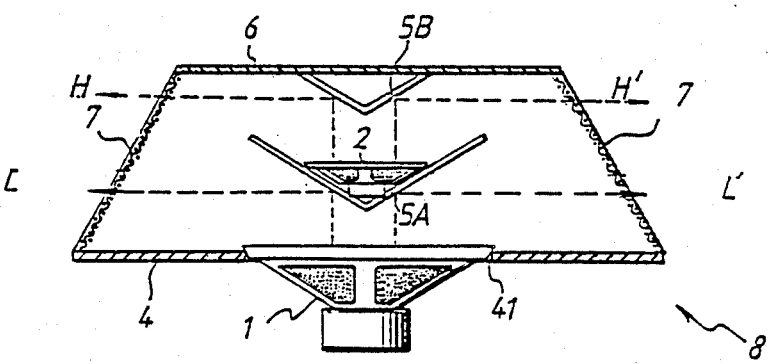
FIG. 2 is a schematic cross section of the loudspeaker system of one preferred embodiment of the present invention.
Figure 3:
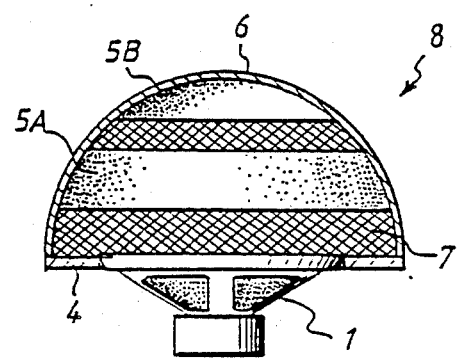
FIG. 3 is a left-side elevation of the loudspeaker system shown in FIG. 2.

Referring more particularly to the drawings, in FIG. 1 to 3 there is shown a loudspeaker system (generally indicated at 8) having a cover of elongated substantially half-cylindrical periphery, which can be provided with various dimensional arrangements. The preferred length, width and diameter of the cover would be adjusted according to the diameter of the membrane of the low frequency transducer such that no space more than necessary is occupied.

Accordingly, one embodiment of the invention 8 comprises a low frequency transducer 1, a high frequency transducer 2, and a cover 3 composed of a flat bottom side 4 with aperture 41 positioned center of such, two sound reflector panels of V-shaped cross section 5A, 5B, elongated substantially half-cylindrical periphery 6 open at the two oppositely disposed lengthwise terminating ends with lower section thereof inclined downwardly and outwardly from the terminating end of corresponding upper section, and two acoustic foam covers 7 attached to the oppositely disposed terminating ends. The low frequency transducer 1 is attached to the underside of the flat bottom side 4 with membrane thereof corresponding to and facing aperture 41. The high frequency transducer 2 is suitably affixed between the angle members of sound reflector panel 5B with membrane facing sound reflector panel 5B fixed above, which is attached to the underside of half-cylindrical periphery 6. The lower sound reflector panel of V-shaped cross section 5A is appropriately attached to the oppositely disposed inner lengthwise sides of the half-cylindrical periphery 6 with sufficient open space between the terminating end of each angle member and the half-cylindrical periphery 6 underside such that sound output of the high frequency transducer 2 is allowed to pass unobstructed therethrough. The sound reflector panels of V-shaped cross section 5A, 5B are of size and positioned such that a sound reflective surface is provided above the total membrane area of each transducer and the respective sound output thereof is divided into two separate equal halves. As can best be understood from FIG. 1 and 2, the cover 3 is defined as having top-side length relatively shorter than length of flat bottom side 4.

The invention contemplates utilization of a sound transmitting amplifier of the usual well-known type, not shown.

The principal function of the present invention is division of sound output of the two transducers 1, 2 into two separate equal halves to be emitted in symmetrical fashion through the two oppositely disposed terminating ends of the cover. In addition, if the proper distances are secured between placement of the two sound reflector panels 5A, 5B relative to the two transducers 1, 2, sound path length H (as seen in FIG. 2) will be substantially equal to sound path length L, and H' substantially equal to L'. If the path lengths traversed by sound waves of the two transducers are brought to near equality, time and phase discrepancies between the sound waves of the two speakers will be reduced, and an output relatively free of crossfield phase distortion will result.

Figure 4:
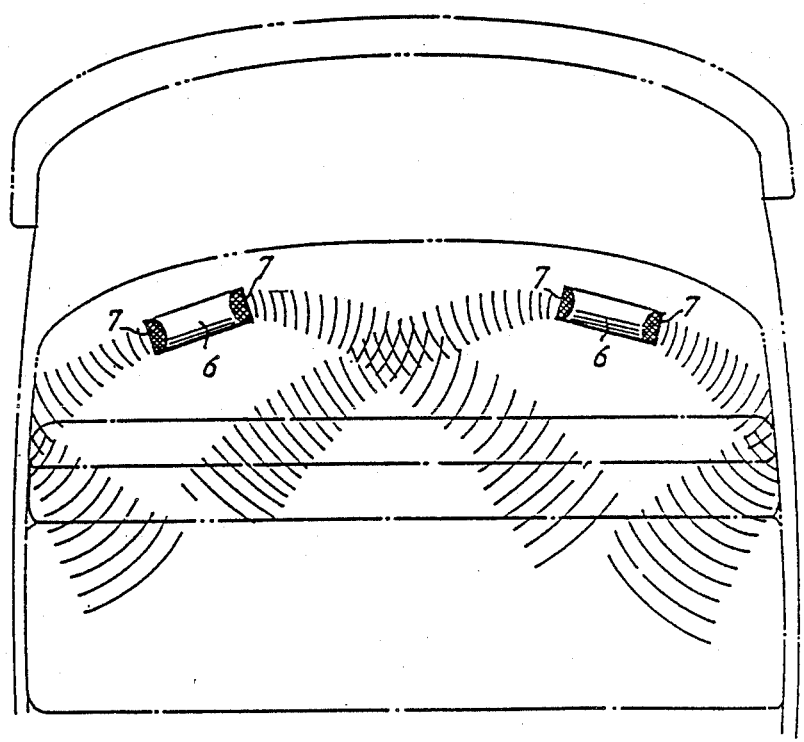
FIG. 4 is a diagram illustrative of the distribution of sound developed by the loudspeaker system of the present invention mounted on the rear parcel tray of a motor vehicle.

As illustrated in FIG. 4, the speaker system of the present invention if mounted on or under the rear parcel tray of a motor vehicle will utilize the rear window and side walls thereof as reflective barriers. The proper angled position of the half-cylindrical periphery 6 with associated side holes is essential so as to direct sound of the two stereo discrete channels to the two locations most often occupied by passengers seated in the rear seat of such motor vehicle. The effect thereof, as can be seen, is enhancement of the stereo-realism provided to such locations.

Figure 5:
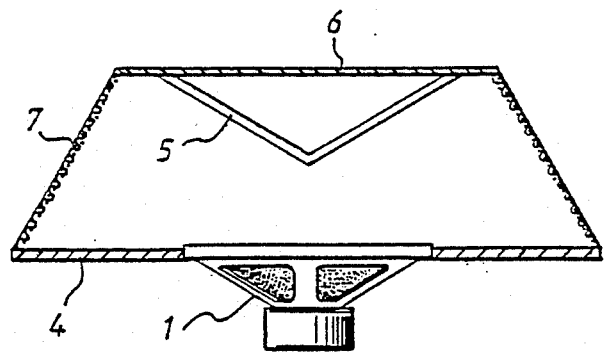
FIG. 5 is a schematic cross section showing a different embodiment of the loudspeaker system of the present invention.

FIG. 5 shows a different embodiment of the present invention as modified for use with a single full-range speaker. The specially designed cover is comprised of previously described flat bottom side 4, half-cylindrical periphery open at the two oppositely disposed terminating ends 6, acoustic foam covers 7, and according to this particular embodiment only one sound reflector panel of V-shaped cross section 5, again posiitoned such as to develop a sound output of two separate equal halves emitted in symmetrical fashion through the two oppositely disposed terminating ends.

Figure 6:
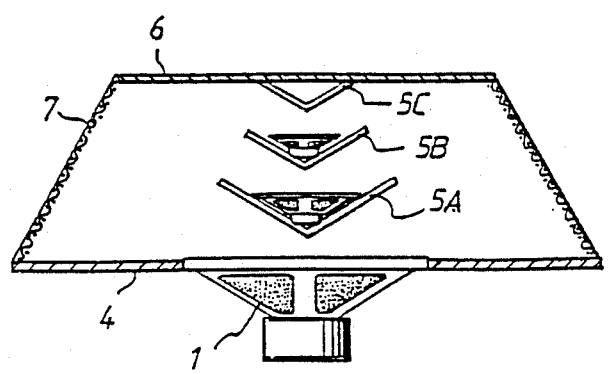
FIG. 6 is a schematic cross section showing yet a different embodiment of the loudspeaker system of the present invention.
Figure 7A:
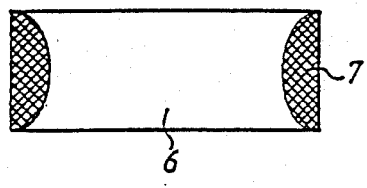
FIG. 7 is top plan views showing various possible embodiments of the loudspeaker system of the present invention.
Figure 7B:
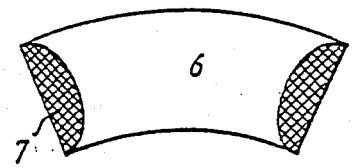
Figure 7C:
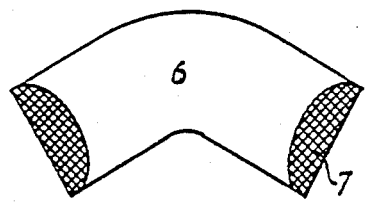
Figure 7D:
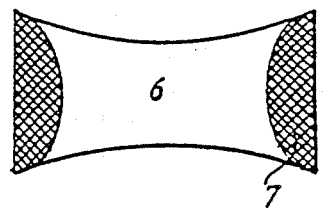

FIG. 6 illustrates yet another embodiment of the present invention as modified for use with a three way speaker system, the cover again comprised of flat bottom side 4, half-cylindrical periphery open at the two oppositely disposed terminating ends 6, and acoustic foam covers 7. The sound reflector panels 5A, 5B, 5C would be fixed in tri-level fashion, again positioned such as to create a sound output of two separate equal halves emitted in symmetrical fashion through the two oppositely disposed terminating ends of the cover. In addition, the sound reflector panels would be positioned relative to each other and their associated transducers such that sound path lengths traversed by output of the three transducers would be as nearly equal as possible.

FIG. 7 is top-side elevations of various possible embodiments of the present invention, A illustrating the specially designed cover 6 as previously described in FIG. 1, B cover 6 as slight arc angle shape, C cover 6 as elbow shape, and D cover 6 as shape possessing terminating ends that flare outwardly.

The described invention may be utilized not only in the environment of a motor vehicle, but in any small, enclosed environment as well, and may also be utilized as a public address system.

Thus there has been shown and described a novel loudspeaker system which fulfills all the objects and advantages sought thereof. Many changes, modifications, variations and other uses and applications of the subject invention will become apparent to those skilled in the art after consideration of the foregoing specifications together with the attached drawings and claims. All such changes, modification, variations and other uses and applications which do not depart from the spirit and scope of the invention are deemed to be covered by the invention which is limited in scope only by the claims that follow.

I claim:

1. A coaxial-type multi-speaker system for use in a motor vehicle comprising:

a low frequency transducer;

a high frequency transducer; and a cover, said cover including an elongated substantially half-cylindrical periphery having two oppositely disposed terminating ends with lower sections thereof inclined downwardly and outwardly from the terminating ends of the corresponding upper sections;

a rigid flat bottom of which length and width are equal to those of the elongated half-cylindrical periphery, said flat bottom having a central aperture, with the low frequency transducer attached to flat bottom and a membrane of said transducer facing such aperture;

and mounted between said cover and said flat bottom, an upper and lower section as defined by two sound reflector panels of substantially V-shaped cross section each panelformed with a pair of angled members, each panel mounted perpendicularly to the length of said elongated substantially half-cylindrical periphery and in double level fashion, an apex portion of a lower level sound reflector panel facing the center of the membrane of the low frequency transducer, the high frequency transducer fixed between the two angled members of the lower level sound reflecting panel, and an upper level sound reflecting panel attached to the underside of the half-cylindrical periphery with an apex portion thereof facing the center of a membrane of the high frequency transducer.

2. A coaxial-type multi-speaker system according to claim 1, wherein a total of three transducers are mounted between said cover and flat bottom and are oriented toward said cover with three sound reflecting panels of V-shaped cross section mounted inside said cover.

3. A coaxial-type multi-speaker system according to claim 1, wherein said cover has at least two oppositely disposed open terminating ends covered with acoustic foam.

* * * * *